United States Patent [19]

Hara et al.

[11] 4,335,340
[45] Jun. 15, 1982

[54] ELECTRIC REVERSIBLE MOTOR CONTROL

[75] Inventors: Takanori Hara, Hiroshima; Yoshihiro Shimamura, Kosai, both of Japan

[73] Assignees: Toyo Kogyo Co., Ltd., Hiroshima; ASMO Co., Ltd., Shizuoka, both of Japan

[21] Appl. No.: 192,838

[22] Filed: Oct. 1, 1980

[30] Foreign Application Priority Data

Oct. 8, 1979 [JP] Japan .................................. 54/130627

[51] Int. Cl.³ .............................................. H02P 1/00
[52] U.S. Cl. ...................................... 318/282; 318/286
[58] Field of Search ................................ 318/282, 286

[56] References Cited

U.S. PATENT DOCUMENTS 3,470,434 9/1969 Jones ..................................... 318/282
4,179,223 12/1979 Kwan et al. ........................ 318/282

Primary Examiner—J. V. Truhe
Assistant Examiner—S. M. Bergmann
Attorney, Agent, or Firm—Wenderoth, Lind & Ponack

[57] ABSTRACT

A motor control apparatus comprises an electric reversible motor, a movable member mechanically connected to the motor, first and second electroconductive bridge members rigidly mounted on the movable member, a plurality of switches, electroconductive feelers equal in number to the number of the switches, a first circuit for supplying an electric power to the first bridge member and also to the motor to rotate the latter in one of the opposite directions when energized, and a second circuit for supplying the electric power to the second bridge member and also to the motor to rotate the latter in the other of the opposite directions when energized.

6 Claims, 5 Drawing Figures

ELECTRIC REVERSIBLE MOTOR CONTROL

BACKGROUND OF THE INVENTION

The present invention generally relates to an electric reversible motor control and, more particularly, to a motor control apparatus for use in association with an automobile air-conditioning system for controlling an electric reversible motor for bringing the automobile air-conditioning system into one of a plurality of air-conditioning modes.

There has long been well known an automobile air-conditioning system comprising an air intake duct and a plurality of distributor ducts branched off from one end of the air intake duct and opening into the interior of an automobile at various locations. The distributor ducts have respective air-mix shutter, vent shutter, and floor shutter installed therein for selectively closing and opening the associated distributor ducts so that not only can the direction and amount of flow of the conditioned air to be introduced into the automobile interior be controlled, but also a plurality of air-conditioning modes can be available one at a time by controlling the shutters according to a desired air-conditioning scheme, that is, by selecting a combination of the shutters to be controlled.

Examples of the above described automobile air-conditioning system are disclosed in the Japanese Utility Model Publications No. 47-852, published on Aug. 8, 1972, and No. 52-36446 published on Mar. 15, 1977. For controlling the motor operatively coupled to the air-mix shutter for selectively closing and opening a by-pass passage through a heat exchanger installed therein so that the air emerging from the air-conditioning system can be either cool or heated, respectively, the first-mentioned Japanese publication utilizes a control circuitry including a temperature sensor for sensing the temperature inside the automobile interior, a differential amplifier electrically connected to the motor, and a circuit for lowering the saturation level of an output from the differential amplifier.

On the other hand, in the second-mentioned Japanese publication, the various shutters are formed in a rotary hollow cylinder carrying the motor rigidly mounted thereon, the drive shaft of which motor extends into the hollow of the rotary cylinder and has a cylindrical fan mounted thereon. In other words, the motor used in the second-mentioned Japanese publication is solely used to drive the cylindrical fan, and the control of the shutters is effected by positioning the motor by the utilization of an electromagnetic device.

Except for the first-mentioned Japanese publication wherein the motor is controlled in response to change in temperature inside the automobile interior, the second-mentioned Japanese publication has failed to disclose a specific manner by which the motor is controlled, that is, a control circuit necessary to control the motor.

SUMMARY OF THE INVENTION

Accordingly, the present invention has for its essential object to provide an electric control circuitry for an electric reversible motor wherein the selection of the air-conditioning mods can be carried out by merely manipulating any one of switches provided for in number equal to the number of the air-conditioning modes.

Another object of the present invention is to provide an electric control circuitry of the type referred to above, wherein an electric switch arrangement employed is effective to provide a good-looking appearance when installed on an instrument panel inside the automobile.

A further object of the present invention is to provide an electric control circuitry of the type referred to above, which does not require the use of relatively complicated and expensive circuit components and, therefore, can be manufactured at a relatively reduced cost.

According to the present invention, there is provided a motor control apparatus comprising an electric reversible motor, a movable member mechanically connected to the motor, first and second electroconductive bridge members rigidly mounted on the movable member for movement together therewith, a plurality of switch means, electroconductive feelers equal in number to the number of the switch means, a first circuit means for supplying an electric power to the first bridge member and also to the motor to rotate the latter in one of the opposite directions when energized, and a second circuit means for supplying the electric power to the second bridge member and also to the motor to rotate the latter in the other of the opposite directions when energized.

Each of the feelers has one end connected to the corresponding switch means and the other end arranged on the path of movement of the first and second bridge members and resiliently urged to slidingly contact any one of the first and second bridge members. The first and second bridge members are spaced from each other a predetermined distance so selected as to be smaller than the maximum possible space between the two neighboring feelers.

In operation, when a selected one of the switch means is closed, and if the selected switch means so closed is then connected to the first circuit means through the first bridge member, the first circuit means is energized. On the other hand, when a selected one of the switch means is closed and if the selected switch means so closed is then connected to the second circuit means through the second bridge member, the second circuit means is energized.

In this control circuitry of the present invention, no complicated and expensive circuit component, such as memories necessary to store information concerning which one of the switch means has previously been closed or manipulated, is required.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
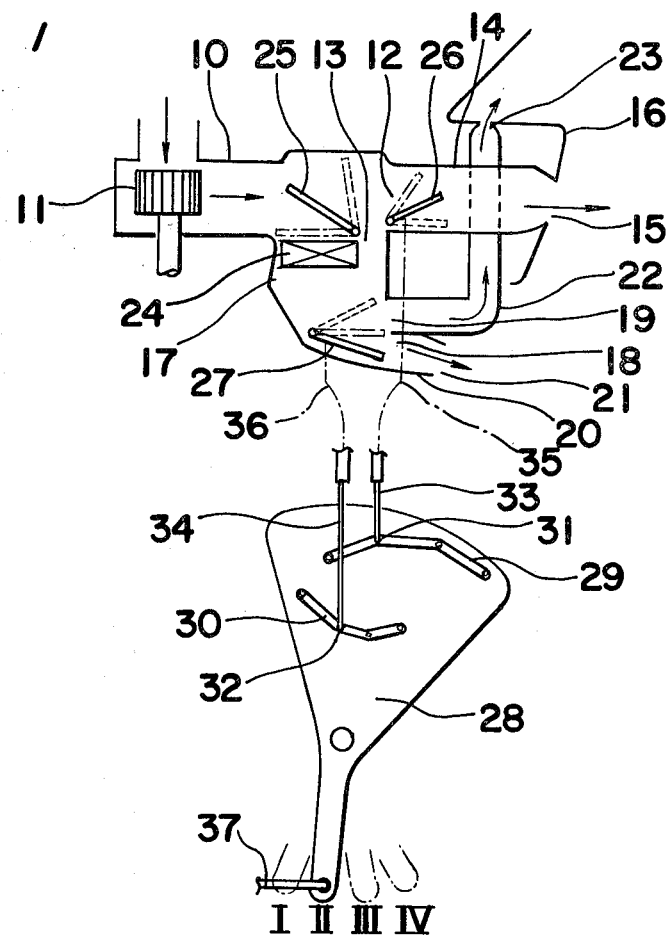
FIG. 1 is a schematic diagram showing an automobile air-conditioning duct system utilizing various shutters to be controlled.

Before the description of the present invention proceeds, it is to be noted that like parts are designated by like reference numerals throughout the accompanying drawings.

Referring first to FIG. 1, there is schematically shown an automobile air-conditioning system which comprises an air intake duct 10 having a motor-driven blower 11 installed therein and also having one end communicated to a source of air, for example, the atmosphere, the other end of said duct 10 having a pair of openings 12 and 13 defined therein, a first distributor duct 14 having one end fluid-connected to the air intake duct 10 in communication with the opening 12 and the other end formed as a first air exit 15 opening at an automobile instrument panel 16 so as to face towards the upper body of an automobile driver who may be sitting on a driver's seat inside the automobile, a mixing duct 17 having one end fluid-connected to the air intake duct 10 in communication with the opening 13 and the other end having a pair of openings 18 and 19. The opening 18 of the mixing duct 17 is in turn communicated to a second distributor duct 20 having its free end formed as a second air exit 21 opening towards the lower body, for example, feet, of the driver inside the automobile, while the opening 19 of the mixing duct 17 is communicated to a third air exit or defroster exit 23 opening upwardly at the top of the instrument panel 16 so as to face the front windscreen glass of the automobile.

The air-conditioning system also comprises a heat-exchanger or heater core 24 so installed in the mixing duct 17 adjacent the air intake duct 10 as to permit a stream of air flowing from the air intake duct 10 into the mixing duct 17 to be heated as it passes through the heater core 24, a deflector shutter 25 pivotally supported inside the air intake duct 10 for movement between heating and cooling positions, a vent shutter 26 pivotally supported, for example, inside the first distributor duct 14 for selectively opening and closing the opening 12 of the air intake duct 10, and a distributor shutter 27 pivotally supported inside the mixing duct 17 for movement between completely opened and completely closed positions. The deflector shutter 25 can be pivoted to any desired position including the heating and cooling positions at the driver's will by manipulating a temperature adjustment lever (not shown) operatively coupled to the deflector shutter 25 through any suitable linkage system and installed on the instrument panel 14 at a location accessible to the driver. On the other hand, the vent shutter 26 and the distributor shutter 27 are operatively associated, and operated simultaneously, with each other by means of a drive plate 28 having a pair of cam slots 29 and 30 of different configuration defined therein.

The drive plate 28 is pivotally supported for movement between first and fourth positions I and IV past a plurality of, for example, second and third, intermediate positions II and III and has roller elements 31 and 32 engaged respectively in the cam slots 29 and 30. These roller elements 31 and 32 are carried by respective operating rods 33 and 34 which are in turn connected to the vent shutter 26 and the distributor shutter 27 by means of any suitable linkage system, for example, associated push-and-pull cables 35 and 36. The cam slots 29 and 30 in the drive plate 28 is so shaped as to achieve the following functions.

Mode I: When the drive plate 28 is in the first position I, the vent shutter 26 is held in position to completely open the opening 12 of the air intake duct 10 as shown by the broken line while the distributor shutter 27 is held in the completely closed position as shown by the broken line.

Mode II: When the drive plate 28 is in the second position II, the vent shutter 26 is held in an intermediate position as shown by the solid line, to partially open the opening 12 of the air intake duct 10 while the distributor shutter 27 is held in the completely opened position as shown by the solid line to permit a stream of air flowing through the mixing duct 17 to be distributed onto both of the ducts 20 and 22.

Mode III: When the drive plate 28 is in the third position III, the vent shutter 26 is held in position to completely close the opening 12 of the air intake duct 10 as shown by the chain line while the distributor shutter 27 is held in the completely opened position as shown by the solid line.

Mode IV: When the drive plate 28 is in the fourth position IV, the vent shutter 26 is held in position to completely close the opening 12 of the air intake duct 10 while the distributor shutter 27 is held in a substantially intermediate position, as shown by the chain line, between the completely closed and opened positions to interrupt the communication between the mixing duct 17 and the second distributor duct 20.

It is to be noted that the deflector shutter 25 is adapted to close the entrance to the heater core 24 when pivoted to the cooling position as shown by the chain line and to interrupt the communication between the air intake duct 10 and the first distributor duct 14, but to open the entrance to the heater core 24 when pivoted to the heating position as shown by the broken line. However, when in a substantially intermediate position as shown by the solid line, the deflector shutter 25 permits the incoming air stream to flow in part towards the first distributor duct 14 (and the mixing duct 17 particularly when the vent shutter 26 is held in position to close the opening 12) and also in part towards the mixing duct 17 through the heater core 24.

The drive plate 28 is operatively coupled to a generally elongated, motor-driven actuating member 38 (FIG. 2) coupled thereto by means of any suitable motion transmitting system, for example, a connecting rod 37 having its opposite ends pivotally secured to the drive plate 28 and the actuating member 38, respectively. The actuating member 38 shown in FIG. 2 is supported in any suitable manner for reciprocal movement in a direction parallel to the longitudinal extent of said actuating member 38.

Figure 2:
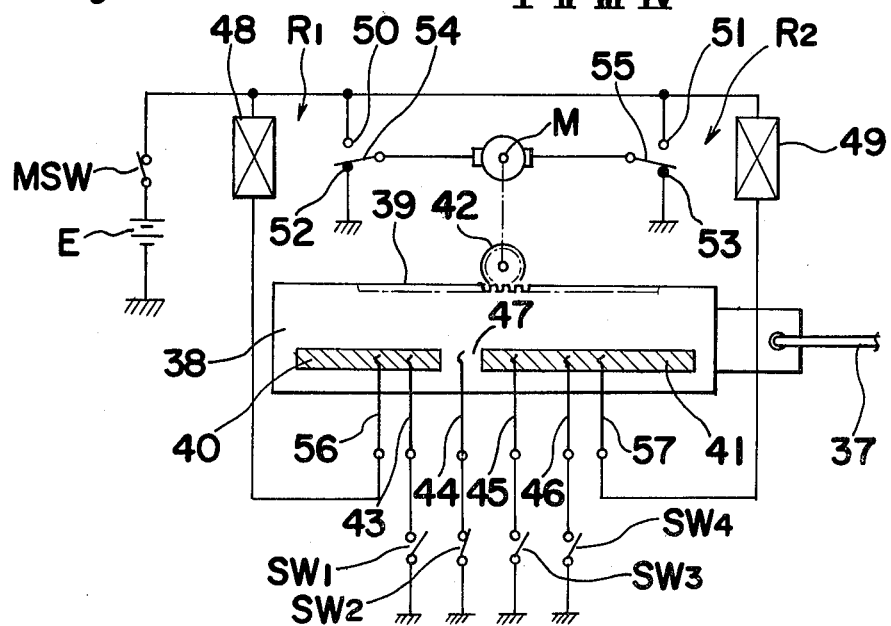
FIG. 2 is a circuit diagram showing an electric motor control for controlling a drive mechanism used in the air-conditioning system of FIG. 1.

Referring now to FIG. 2, the actuating member 38 has one side edge formed with a rack gear 39 extending longitudinally thereof and also has first and second electroconductive bridge strips 40 and 41 rigidly mounted thereon in line with each other. These electroconductive bridge strips 40 and 41 are spaced a predetermined distance from each other and extend on one flat surface of the actuating member 38 in a direction longitudinally of said actuating member 38. The rack gear 39 on the actuating member 38 is constantly held in mesh with a pinion gear 42 which may be either mounted on a drive shaft of an electric reversible motor M or drivingly coupled to the motor M in any suitable manner known to those skilled in the art, whereby rotation of the motor M results in the axial movement of the actuating member 38.

From the foregoing, it will readily be seen that the axial reciprocal movement of the actuating member 38 results in the pivotal movement of the drive plate 28 from the first position I to the fourth position IV and then back to the first position I from the fourth position IV.

Referring still to FIG. 2, in accordance with the present invention, there is provided an electric control circuitry for the electric reversible motor M. This control circuitry comprises a plurality of manipulatable switches equal in number to the number of the positions of the drive plate 28, that is, first, second, third and fourth switches SW1, SW2, SW3 and SW4 so far illustrated, and a pair of relay units R1 and R2. Each of the manipulatable switches SW1 to SW4 employed in the embodiment shown in FIG. 2 is a single pole single throw switch of a type having a fixed contact and a movable contact, the movable contacts of all of the switches SW1 to SW4 being grounded while the fixed contacts of all of the switches SW1 to SW4 are electrically connected to corresponding electroconductive feelers 43, 44, 45 and 46. These feelers 43 to 46 are supported stationarily relative to the actuating member 38 in spaced relation to each other with their respective free ends resiliently urged to contact any one of the first and second bridge strips 40 and 41 fast with the actuating member 38. It is to be noted that the first to fourth switches SW1 to SW4 correspond respectively to the first to fourth positions I to IV of the drive plate 28 and that one of the feelers 43 to 46 is normally electrically insulated from any one of the bridge strips 40 and 41 and is, therefore, positioned in an insulating region 47 between the first and second bridge strips 40 and 41 depending on the position of the actuating member 38. So far illustrated, by the reason as will become clear from the subsequent description, the feeler 44 is shown as positioned in the insulating region 47 of the actuating member 38 then positioned to set the drive plate 28 to assume the second position II as shown in FIG. 1. It is also to be noted that the width of the insulating region 47 as measured between the bridge strips 40 and 41 is so selected as to be smaller than the minimum possible spacing between the two neighbouring feelers where the feelers 43 to 46 are arranged at irregular intervals one after another in the longitudinal direction of the actuating member 38.

Each of the relay units R1 and R2 is of a type including a relay coil 48 or 49, a pair of fixed contacts 50 and 52 or 51 and 53 and a movable contact 54 or 55, said movable contact 54 or 55 being normally engaged to the corresponding fixed contact 52 or 53 when and so long as the associated relay coil 48 or 49 is not electrically energized, but engageable to the corresponding fixed contact 50 or 51 when the associated relay coil 48 or 49 is electrically energized. As shown, the relay coils 48 and 49 are electrically connected at one end to a source of electric power, for example, an automobile battery E, through a main switch MSW and at the other end to respective electroconductive, power supply feelers 56 and 57. The power supply feelers 56 and 57 are stationarily supported relative to the actuating member 38 in a manner similar to any one of the feelers 43 to 46 and are constantly slidingly engaged respectively to the first and second bridge strips 40 and 41 irrespective of wherever the actuating member 38 is positioned.

In the arrangement shown in FIG. 2, the manipulatable switches SW1 to SW4 are to be understood as forming respective parts of a keyboard switch assembly of a type wherein when any one of the switches SW1 to SW4 is switched on, one of the switches SW1 to SW4 which has previously been switched on is automatically switched off.

The control circuitry of the construction shown in FIG. 2 operates as follows.

Assuming that the switch SW2 is closed as shown, no electric current from the battery E flow through any one of the relay coils 48 and 49 and the actuating member 38 is the held at a position corresponding to the second position II of the drive plate 28. This is because the feeler 44 is in register with the insulating region 47 of the actuating member 38 and is, therefore, electrically isolated from any one of the bridge strips 40 and 41. If the driver wishes to set the drive plate 28 at, for example, the fourth position IV, what he has to do is to close the switch SW4 allowing the once-closed switch SW2 to open. The closure of the switch SW4 effected in this manner results in completion of an electric circuit between the feelers 46 and 57 through the bridge strip 41, and therefore the electric current flows through the relay coil 49 to energize the latter. The movable contact 55 of the relay unit R2 which is normally engaged to the fixed contact 53 is engaged to the fixed contact 51 in response to the energization of the relay coil 49. Accordingly, the electric current from the battery E flows through the reversible motor M through the relay switch of the relay unit R2 to rotate the pinion gear 42 in a counterclockwise direction as viewed in FIG. 2.

The counterclockwise rotation of the pinion gear 42 is accompanied by the linear movement of the actuating member 38 in a rightward direction as viewed in FIG. 2 and this continues until the feeler 46 connected to the closed switch SW4 is brought in register with the insulating region 47. At the time the feeler 46 is brought in register with the insulating region 47, the electric circuit between the feelers 46 and 57 through the bridge strip 41 is opened and the electric current no longer flows through the relay coil 49. Therefore, the relay coil 49 is deenergized to permit the movable contact 55, which has been engaged to the fixed contact 51, to be engaged to the fixed contact 53, resulting in deenergization of the motor M. It is to be noted that the rightward movement of the actuating member 38 is transmitted to the drive plate 28 through the connecting rod 37 and, therefore, at the time the rightward movement of the actuating member 38 effected as a result of the closure of the switch SW4 has completed, the drive plate 28 is held in the fourth position IV.

Starting from this condition, where the driver subsequently wishes to change the fourth position IV of the drive plate 28 to the first position I of the same drive plate 28, this can be accomplished by closing the switch SW1. More specifically, since the feelers 43, 44, 45 and 46 are all connected to each other when and so long as the drive plate 28 is in the fourth position IV through the bridge strip 40, closure of the switch SW1 results in energization of the relay coil 48 to cause the movable contact 54 to be engaged to the fixed contact 50. Engagement of the movable contact 54 to the fixed contact 50 results in the flow of the electric current from the battery E through the motor M in a direction reverse to that effected during the engagement of the movable contact 55 to the fixed contact 51 and, accordingly, the pinion gear 42 is rotated in a clockwise direction as viewed in FIG. 2, thereby permitting the actuating member 38 to move leftwards as viewed in FIG. 2. This leftward movement of the actuating member 38 continues until the feeler 43 connected to the closed switch SW1 is brought in register with the insulating region 47 at which time the circuit between the feelers 43 and 56 through the bridge strip 40 is interrupted to deenergize the relay coil 48. Deenergization of the relay coil 48 permits the return of the movable contact 54, which has been engaged to the fixed contact 50, to the fixed contact 52, thereby bringing the motor M into an inoperative position.

The control circuitry shown in FIG. 2 may have a lamp display unit for providing a visual indication of which one of the switches SW1 to SW4 has been closed, that is, a visual indication of the current position of the drive plate 28. This example is shown in FIG. 3.

Figure 3:
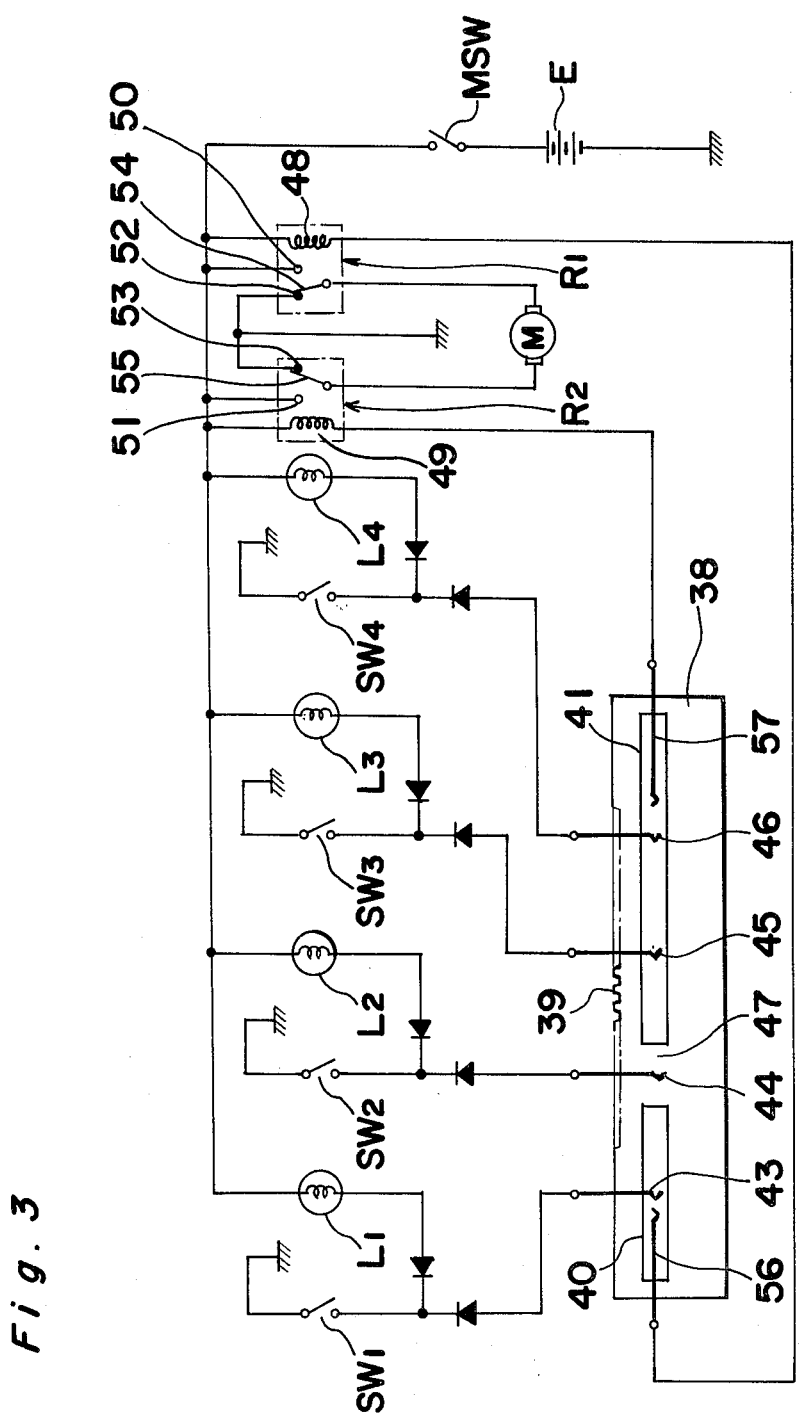
FIG. 3, FIG. 4 and FIG. 5 are circuit diagrams showing respective control circuitries according to other preferred embodiments of the present invention.

Referring now to FIG. 3, the lamp display unit comprises electric lamps L1, L2, L3 and L4 one for each position of the drive plate 28, each of said lamps L1 to L4 being electrically connected at one end to the battery E and at the other end to the corresponding feelers 43 to 46. It is clear that selective closure of the switches SW1 to SW4 one at a time results in lighting of the corresponding lamps L1 to L4, respectively.

In any one of the embodiments shown respectively in FIGS. 2 and 3, the manipulatable switches SW1 to SW4 have been described as forming parts of the key board switch assembly of a type wherein closure of any one of the switches SW1 to SW4 renders the switch, which has previously been closed, to be automatically opened. However, instead of the employment of such keyboard switch assembly, a rotary switch assembly having fixed contacts equal in number to the number of the positions I to IV of the drive plate 28 and a single movable contact movable together with a manipulatable rotor is also possible as can readily be recognized by those skilled in the art.

Moreover, instead of the employment of the keyboard switch assembly including the manipulatable switches SW1 to SW5, it is possible to use push-button switches each being of a type capable of closing when and so long as an external pushing force is applied thereto, but automatically opening when the applied external pushing force is released. This control circuitry wherein the push-button switches are employed is shown in FIG. 4, reference to which will now be made.

Figure 4:
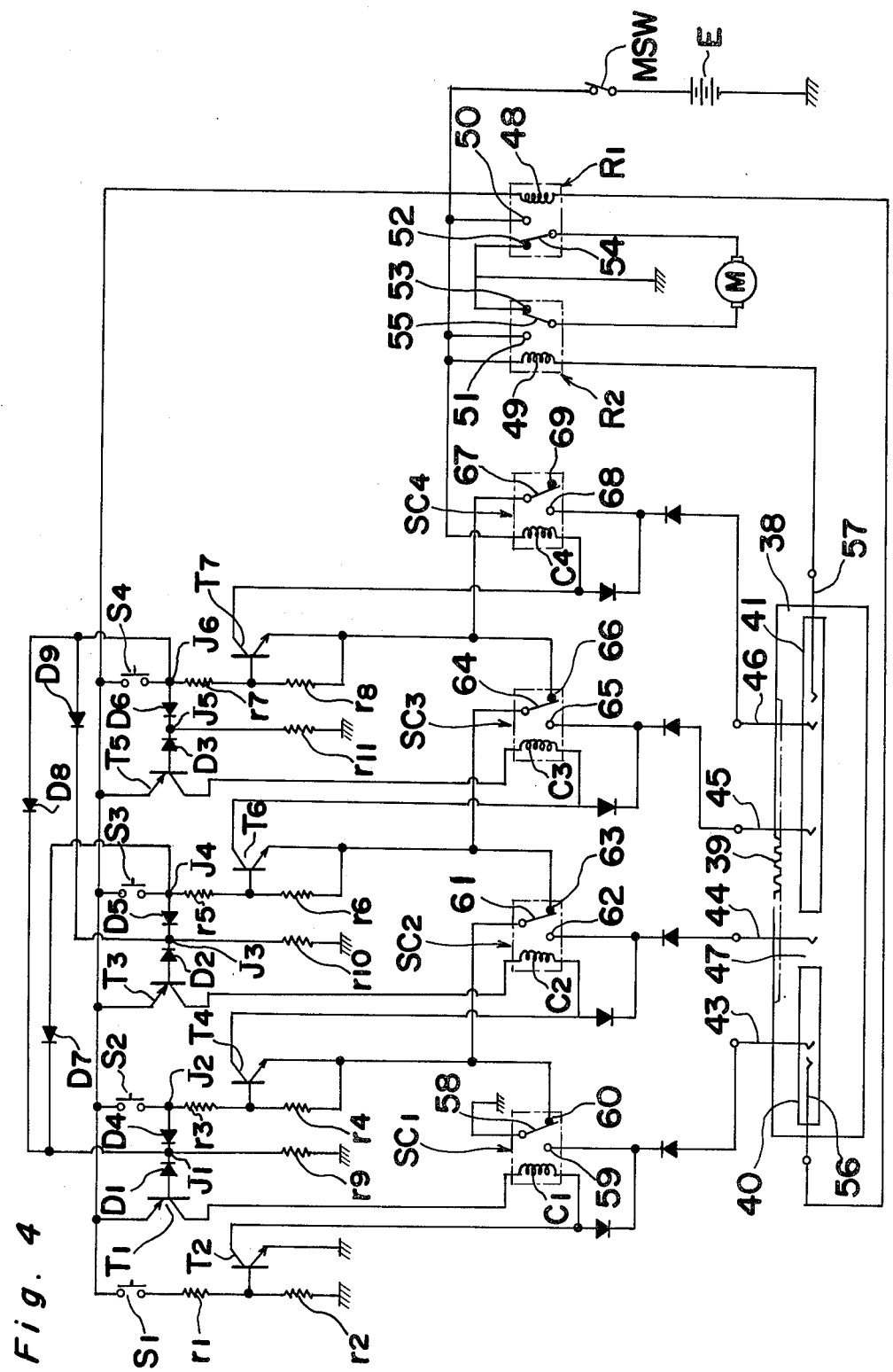

Referring to FIG. 4, the push-button switches are respectively identified by S1, S2, S3 and S4 and form respective parts of switching circuits. Each of the switching circuits comprises, in addition to the respective push-button switch S1, S2, S3 or S4, and a self-energizing circuit SC1, SC2, SC3 or SC4 operable to complete an electric circuit between the corresponding feeler 43, 44, 45 or 46 and the ground to energize either one of the relay coils 48 and 49 once the corresponding push-button switch S1, S2, S3 or S4 is closed.

The self-energizing circuit SC1 associated with the switch S1 includes a relay coil C1 having one end connected to the battery E through a PNP-type switching transistor T1 and the other end connected to the ground through a NPN-type switching transistor T2, the base of which transistor T2 is connected to the battery E through a resistor r1 and then the switch S1 and also to the ground through a resistor r2 for providing a predetermined biasing voltage to the base thereof, and a relay switch comprised of a movable contact 58 and a pair of fixed contacts 59 and 60, said movable contact 58 being engageable to the fixed contact 59 when and after the relay coil C1 has been energized, but normally engaged to the fixed contact 60 during deenergization of the relay coil C1. The movable contact 58 is connected to the ground while the fixed contact 59 is connected to the feeler 43 and also to said other end of the relay coil C1.

Similarly, the self-energizing circuit SC2 associated with the switch S2 includes a relay coil C2 having one end connected to the battery E through a PNP-type switching transistor T3 and the other end connected to the fixed contact 60 of the relay switch of the self-energizing circuit SC1 through a NPN-type switching transistor T4, the base of which transistor T4 is connected to the battery E through a resistor r3 and then the switch S2 and also to the fixed contact 60 through a resistor r4, and a relay switch comprised of a movable contact 61 and a pair of fixed contacts 62 and 63, said movable contact 61 being engageable to the fixed contact 62 when and after the relay coil C2 has been energized, but normally engaged to the fixed contact 63 during deenergization of the relay coil C2. The movable contact 61 is connected to the fixed contact 60 of the relay switch of the self-energizing circuit SC1 while the fixed contact 62 is connected to the feeler 44 and also to said other end of the relay coil C2.

The self-energizing circuit SC3 associated with the switch S3 includes a relay coil C3 having one end connected to the battery E through a PNP-type switching transistor T5 and the other end connected to the fixed contact 63 of the relay switch of the self-energizing circuit SC2 through a NPN-type switching transistor T6, the base of which transistor T6 is connected to the battery E through a resistor r5 and then the switch S3 and also to the fixed contact 63 through a resistor r6, and a relay switch comprised of a movable contact 64, connected to the fixed contact 63, and a pair of fixed contacts 65 and 66, the fixed contact 65 being connected to the feeler 45 and also to the other end of the relay coil C3. It is to be noted that the movable contact 64 is engageable to the fixed contact 65 when and after the relay coil C3 has been energized, but is normally engaged to the fixed contact 66 during deenergization of the relay coil C3.

The self-energizing circuit SC4 associated with the switch S4 includes a relay coil C4 having one end connected to the battery E and the other end connected to the fixed contact 66 of the relay switch of the self-energizing circuit SC3 through a NPN-type switching transistor T7, the base of which transistor T7 is connected to the battery E through a resistor r7 and then the switch S4 and also to the fixed contact 66 through a resistor r8, and a relay switch comprised of a movable contact 67, connected to the fixed contact 66, and a pair of fixed contacts 68 and 69, said fixed contact 68 being connected to the feeler 46 and also to said other end of the relay coil C4. It is to be noted that the movable contact 67 is engaged to the fixed contact 68 when and after the relay coil C4 has been energized, but is normally engaged to the fixed contact 69 during deenergization of the relay coil C4. It is also to be noted that, in the embodiment shown in FIG. 4, the fixed contact 69 of the relay switch of the self-energizing circuit SC4 is not utilized and, therefore, the relay switch of the self-energizing circuit SC4 may be of a normally opened type having a movable contact and a single fixed contact.

In the control circuitry shown in FIG. 4, the bases of the individual transistors T1, T3 and T5 are connected to the ground through associated diodes D1, D2 and D3 and then associated resistors r9, r10 and r11. By the reason which will become clear from the subsequent description, the junction J1 between the diode D1 and the resistor r9 is connected to a junction J2 between the switch S2 and the resistor r3 through a diode D4, the junction J3 between the diode D2 and the resistor r10 is connected to a junction J4 between the switch S3 and the resistor r5 through a diode D5, and the junction J5 between the diode D3 and the resistor r11 is connected to a junction J6 between the switch S4 and the resistor r7 through a diode D6. The junction J1 is also connected to the junctions J4 and J6 through respective diodes D7 and D8, and the junction J3 is also connected to the junction J6 through a diode D9.

It is to be noted that the transistors T1, T3 and T5 and the diodes D7, D8 and D9 are provided for a disabling circuit operable to disable one of the self-energizing circuits SC1 to SC4, which has previously been brought into a self-energized state as a result of the closure of the corresponding switch S1, S2, S3 or S4, when and after the next succeeding self-energizing circuit has been brought into a self-energized state.

The control circuitry shown in FIG. 4 operates in the following manner. The condition shown in FIG. 4 wherein the feeler 44 is in contact with and in register with the insulating region 47 while the power main switch MSW is closed illustrates that the drive plate 28 is held at the second position II. Starting from this condition, if the driver applies a push to, for example, the push-button switch S4 to close the latter, the relay coil C4 of the self-energizing circuit SC4 is energized and is then brought into a self-energized state. More specifically, the closure of the switch S4 permits the predetermined biasing voltage across the resistor r8, which is then grounded through the relay switches of the respective self-energizing circuits SC4, SC3, SC2 and SC1, to be applied to the base of the transistor T7 to bring the latter in a conductive state and, therefore, the relay coil C4 is energized. The energization of the relay coil C4 in turn results in engagement of the movable contact 67 to the fixed contact 68 and the relay coil C4 is therefore brought into the self-energized state with the movable contact 67 engaged to the fixed contact 68. Since the engagement of the movable contact 67 to the fixed contact 68 completes the circuit between the feeler 46 and the ground through the relay switch of the self-energizing circuit SC4, the electric current from the battery E flows towards the ground through the relay coil 49 of the relay unit R2, the feeler 57, the bridge strip 41, the feeler 46 and the relay switches of the respective self-energizing circuits SC4, SC3, SC2 and SC1, thereby energizing the relay coil 49.

The movable contact 55 of the relay unit R2 then normally engaged to the fixed contact 53 and, therefore, grounded is engaged to the fixed contact 51 in response to the energization of the relay coil 49 and, accordingly, the electric current from the battery E flows through the reversible motor M to rotate the pinion gear 42 in the counterclockwise direction as viewed in FIG. 2 and in the manner as described in connection with the embodiment of FIG. 2. In this way, the actuating member 38 is moved towards the right and, therefore, the drive plate 28 is moved to the fourth position IV. It is to be noted that the supply of the electric current to the motor M is interrupted when the actuating member 38 arrives at a position corresponding to the fourth position IV of the drive plate 28, at which time the feeler 46 is brought in register with the insulating region 47. It is also to be noted that, even after the drive plate 28 has been moved to the fourth position IV in the manner described above and the feeler 46 has been brought in register with the insulating region 47, the relay coil C4 is still in the self-energized state.

However, the relay coil C4 of the self-energizing circuit SC4 which has been effected as a result of the closure of the switch S4 can be released from the self-energized state when and after any one of the other switches S1 to S3 has been closed. By way of example, when the switch S2 is closed, the relay coil C2 is energized in a manner similar to the energization of the relay coil C4 effected as a result of the closure of the switch C4. Since the energization of the relay coil C2 causes the movable contact 61 to be engaged to the fixed contact 62, permitting the fixed contact 63 to isolate from any electrical connection, the circuit between the battery E and the ground that has been established through the relay switches of the individual self-energizing circuits SC4, SC3, SC2 and SC1 is interrupted whereby the relay coil C4 is deenergized.

On the other hand, it is clear that the closure of the switch S2 subsequent to the closure of the switch S4, that is, subsequent to the arrival of the drive plate 28 to the fourth position IV results in the return of the actuating member 38 back to the original position as shown in FIG. 4 with the feeler 44 aligned with the insulating region 47 and with the drive plate 28 held at the second position II, the movable contact 61 in the self-energizing circuit SC2 being, however, engaged to the fixed contact 62 because of the self-energized state of the relay coil C2 so long as the main switch MSW is turned on.

The relay coil C2 in the self-energized state can be deenergized in two alternative ways except for the opening of the main switch MSW. One way is to isolate the fixed contact 60 in the self-energizing circuit SC1 from any electric connection and this can be accomplished by energizing the relay coil C1, that is, closing the switch S1. The other way is to switch off the transistor T3 and this can be accomplished by closing either one of the switches S3 and S4.

Specifically, when one of the switches, for example, the switch S3, is closed while the relay coil C2 is in the self-energized state, the electric current across the closed switch S3 flows to the ground through the diode D5 and the resistor r10 via the junction J3. As the electric current flows to the ground through the junction J3, the potential at the junction J3 is so increased as to cause the transistor T3 to be switched off. Accordingly, the relay coil C2 in the self-energized state can be deenergized in response to the switching-off of the transistor T3, resulting in the engagement of the movable contact 61 to the fixed contact 63 to ground the emitter of the transistor T6 and the movable contact 64 in the self-energizing circuit SC3. Simultaneously therewith, the relay coil C3 is energized so that the actuating member 38 can ultimately be moved to a position corresponding to the third position III of the drive plate 28.

On the other hand, when the switch S4 is closed while the relay coil C2 is in the self-energized state, the electric current across the closed switch S4 flows to the ground through the diode D9 and then the resistor r10 via the junction J3. Accordingly, in a manner similar to that effected as a result of the closure of the switch S3, the potential at the junction J3 is increased and, therefore, the transistor T3 is switched off to deenergize the relay coil C2.

In any event, it will readily be seen that the relay switches of the respective self-energizing circuits SC1, SC2, SC3 and SC4 correspond in function to the manipulatable switches SW1, SW2, SW3 and SW4 employed in any one of the embodiments shown respectively in FIGS. 2 and 3.

The control circuitry of the construction shown in FIG. 4 may have the lamp display unit shown in FIG. 3. The control circuitry utilizing the lamp display unit is shown in FIG. 5.

Figure 5:
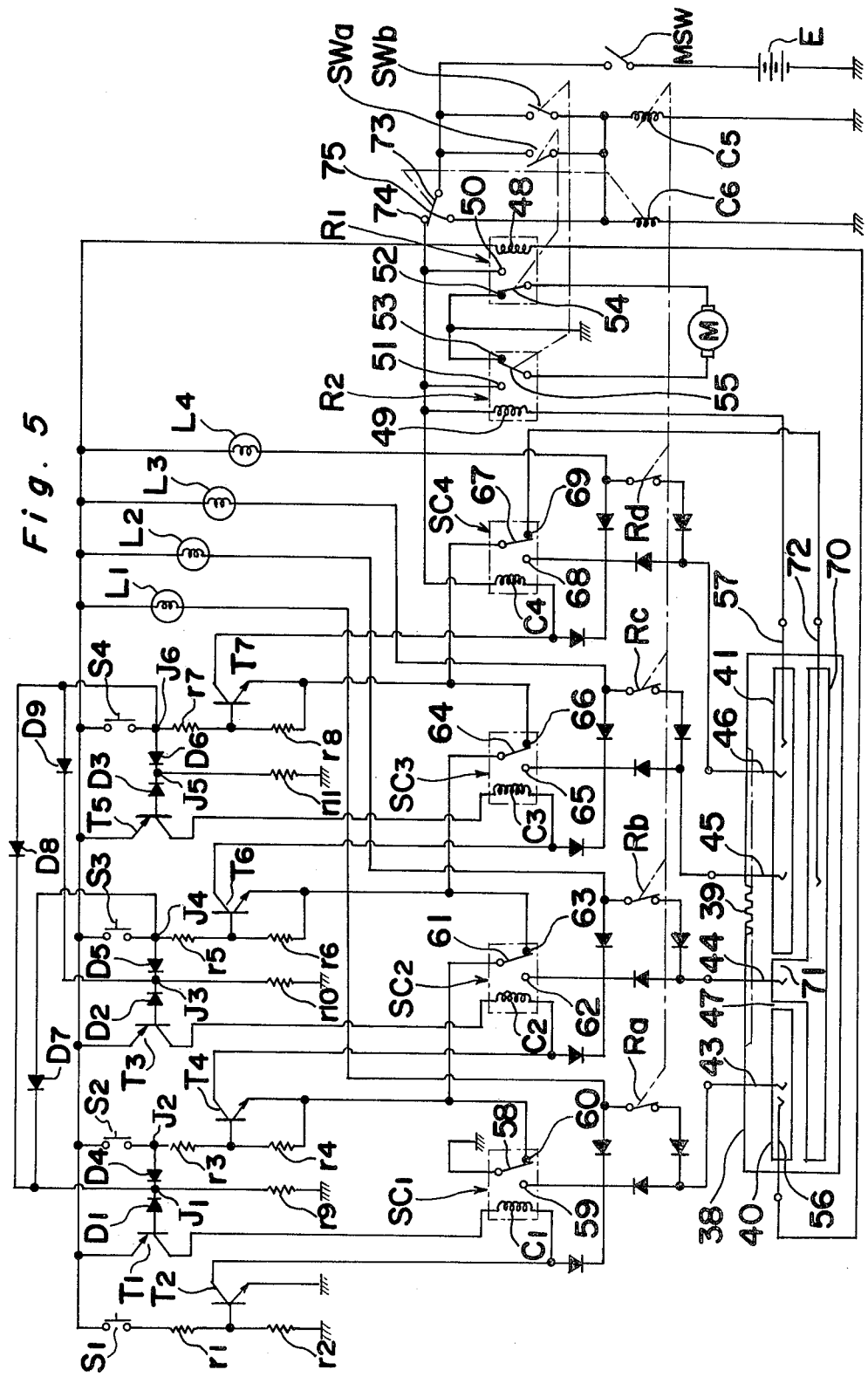

Referring now to FIG. 5, so far illustrated therein, the lamp display unit including the lamps L1, L2, L3 and L4 electrically connected in the manner described with reference to FIG. 3 is satisfactory in that a visual indication of which one of the switches S1 to S4 has been closed, that is, the currently occupied position of the drive plate 28 is available during the closure of the main switch MSW. However, in the case where the main switch MSW is closed after having been opened, the driver may feel an inconvenience in ascertaining the position of the drive plate 28 assumed previously before the main switch MSW was opened. (It is to be noted that this sort of inconvenience may not occur with the embodiment of FIG. 3 because a button of one of the switches SW1 to SW4 which has been closed is kept in a depressed condition and the depressed condition of the button of the closed switch is an indication of which one of the switches SW1 to SW4 has been closed.)

In order to avoid the above described inconvenience, the lamp display unit employed in the control circuitry of FIG. 5 further comprises a display control relay unit including a relay coil C5 and normally closed relay switches Ra, Rb, Rc and Rd and adapted to be closed simultaneously upon energization of the relay coil C5, parallel-connected first and second switches SWa and SWb inserted between the battery E and the relay coil C5, and an electroconductive strip 70 rigidly mounted on, and extending generally in a lengthwise direction of, the actuating member 38.

As shown, the electroconductive strip 70 is electrically insulated from any one of the bridge strips 40 and 41 and has a projection 71 protruding laterally from a generally intermediate portion thereof and into the insulating region 47. This electroconductive strip 70 is electrically connected to the fixed contact 69 of the relay switch of the self-energizing circuit SC4 by means of a feeler 72 which is supported stationarily relative to the actuating member 38 and constantly in sliding contact with the electroconductive strip 70 irrespective of wherever the actuating member 38 is positioned. It will readily be seen that the feeler is, so long as the relay switches of the respective self-energizing circuits SC1 to SC4 are conditioned as shown in FIG. 5, grounded through those relay switches of the respective self-energizing circuits SC1 to SC4.

Each of the relay switches Ra to Rd of the display control relay unit has one end connected to the corresponding lamp L1, L2, L3 or L4 and the other end connected to the corresponding feeler 43, 44, 45 or 46 through a respective diode so connected as to allow the flow of the electric current towards the respective feeler 43, 44, 45 or 46 past the respective relay switch Ra, Rb, Rc or Rd during the closure of the latter.

The first switch SWa connected in series with the relay coil C5 of the display control relay unit may form an additional component part of the relay unit R1 and is so operatively associated with the relay switch of the relay unit R1 that, when the relay coil 48 is energized with the movable contact 54 consequently engaged to the fixed contact 50, the switch SWa is closed. Similarly, the second switch SWb connected in series with the relay coil C5, but in parallel to the first switch SWa, may form an additional component part of the relay unit R2 and is so operatively associated with the relay switch of the relay unit R2 that, when the relay coil 49 is energized with the movable contact 55 consequently engaged to the fixed contact 51, the switch SWb is closed.

The lamp display unit employed in the control circuitry of FIG. 5 operated in the following manner. Assuming that the various components of the control circuitry for the motor M are conditioned as shown, mere closure of the main switch MSW results in lighting of the lamp L2 indicating that the drive plate 28 has been held at the second position II. This is because the electric current flowing through the lamp L2 flows to the ground by means of the switch Rb, the feeler 44, the electroconductive strip 70, the feeler 72, the movable contact 67 engaged to the fixed contact 69, the movable contact 64 engaged to the fixed contact 66, the movable contact 61 engaged to the fixed contact 63 and finally the movable contact 58 engaged to the fixed contact 60.

However, when the relay coil 48 is energized as a result of closure of any one of the push-button switches S1 to S4 in the manner as hereinbefore described, the associated first switch SWa is closed and, accordingly, the relay coil C5 is energized. Energization of the relay coil C5 results in opening of all of the relay switches Ra to Rd. If this has happened as a result of the closure of, for example, the switch S1 while the actuating member 38 is positioned as shown, the lamp L1 is lit even though the associated relay switch Ra has been opened. This is because, since the closure of the switch S1 results in energization of the relay coil C1 with the movable contact 58 consequently engaged to the fixed contact 59, the electric current flowing through the lamp L1 flow to the ground through the movable contact 58 without flowing through the switch Ra then opened.

A similar description applies even in the case where the relay coil 49 is energized.

It is to be noted that the lamp display unit of the construction described with reference to and shown in FIG. 5 may equally be employed in the embodiment shown in FIG. 4.

The control circuitry shown in FIG. 5 is also provided with a safety circuit for disabling the operation of the entire control circuitry in the event that the system malfunctions, for example, when a trouble occurs with the motor M, to avoid waste of the battery E and/or the overloading of the motor M. This safety circuit includes a delayed relay unit of any known construction including a relay coil C6 connected in series with the first and second switches SWa and SWb and a relay switch having a movable contact 73 and a pair of fixed contacts 74 and 75, said movable contact 73 being normally engaged to the fixed contact 74 during deenergization of the relay coil C6 to provide an electric power to the control circuitry for the motor M while the fixed contact 75 is connected in series with the relay coil C6. This delayed relay unit is so designed that the movable contact 73 normally engaged to the fixed contact 74 is switched over to the fixed contact 73 after a predetermined delay time characteristic of the delayed relay unit subsequent to the energization of the relay coil C6, it being to be understood that the energization of the relay coil C6 takes place when any one of the switches SWa and SWb is closed in response to the energization of the corresponding relay coil 48 or 49.

From the foregoing, it is clear that, in the event that the actuating member 38 fails to complete a required linear movement by reason of, for example, the malfunctioning of the motor or a mechanical jamming which may take place in the linkage system between the actuating member 38 and the drive plate 28, within a length of time equal to or slightly shorter than the preset delay time characteristic of the delayed relay unit, the supply of the electric power to the control circuitry is completely interrupted with the movable contact 73 switched over to the fixed contact 75 after the lapse of the preset delay time.

The safety circuit of the above described construction can also be incorporated in the control circuitry of the construction shown in any one of FIGS. 2 to 4.

Although the present invention has fully been described in connection with the preferred embodiments thereof with reference to the accompanying drawings, it is to be noted that various changes and modifications are apparent to those skilled in the art. By way of example, although the control circuitry for the motor M has been described in association with the automobile air-conditioning system, the actuating member 38 may not be necessarily coupled to the air-conditioning system, but may be coupled to any other device requires to be controlled by an electric reversible motor.

Moreover, depending upon the purpose for which the motor M is used and/or the design of the linkage system between the actuating member 38 and the drive plate 28, instead of the generally rectangular, linearly movable actuating member 38 having the bridge strips thereon, a rotary disc having electroconductive strips corresponding in function to those identified by 40, 41 and 70 may be employed, in which case the disc may be rotated directly or indirectly by the motor or another reversible motor synchronized with such motor.

Furthermore, the main switch MSW may form a part of, or operatively associated with, an automobile ignition key switch assembly of any known construction. Alternatively, an extra switch forming a part of, or operatively associated with, the automobile ignition key switch assembly may be inserted between the battery E and the main switch MSW.

Accordingly, such changes and modifications are to be understood as included within the true scope of the present invention unless they depart therefrom.

We claim:

1. A motor control apparatus comprising, in combination:
   an electric reversible motor;
   a movable member operatively coupled to the motor for movement in each of the opposite directions depending on the directon of rotation of the motor;
   first and second electroconductive bridge members carried by the movable member for movement together therewith, said first and second bridge members being spaced at a predetermined distance from each other to define an electrically insulating region therebetween;
   a plurality of electric switch means;
   electroconductive feelers equal in number to the number of the switch means, each of said feelers having one end connected to the corresponding switch means and the other end arranged on the path of movement of the first and second bridge members and resiliently urged to slidingly contact any one of the first and second bridge members, said predetermined distance between the first and second bridge members being so selected as to be smaller than the maximum possible space between the two neighboring feelers;
   a first circuit means for supplying an electric power from a source of electric power to the first bridge member irrespective of the position of the movable member and also for supplying the electric power to the motor to rotate said motor in one of the opposite directions when said first circuit means is electrically energized; and
   a second circuit means for supplying the electric power from the power source to the second bridge member irrespective of the position of the movable member and also for supplying the electric power to the motor to rotate said motor in the other of the opposite directions when said second circuit means is electrically energized, whereby when a selected one of the switch means is closed, said first and second circuit means are energized one at a time in the event that said selected switch means so closed is connected to the first circuit means through the first bridge member and in the event that said selected switch means so closed is connected to the second circuit means through the second bridge member, respectively.

2. An apparatus as claimed in claim 1, wherein each of the first and second circuit means comprises a relay unit including a relay coil having one end connected to the electric power source and the other end connected to the corresponding bridge member, and a relay switch having a movable contact connected to the motor, a first fixed contact connected to the power source and a second fixed contact connected to the ground, said movable contact being normally engaged to the second fixed contact, but engaged to the first fixed contact upon energization of the relay coil.

3. An apparatus as claimed in claim 1 or 2, further comprising an electroconductive slider for each of the first and second circuit means, said slider having one end connected to the corresponding circuit means and the other end resiliently urged to slidingly contact the corresponding bridge member irrespective of the position of the movable member.

4. An apparatus as claimed in claim 3, further comprising a display unit for providing an indication of which one of the switch means has been closed, said display unit including electrically energizable indicators equal in number to the number of the switch means and connected in series between the associated switch means and the power source.

5. An apparatus as claimed in claim 1, 2 or 4, further comprising, for each of the switch means, a push-button switch connected in series with the power source and a self-energizing circuit effective to hold the corresponding switch means in the closed position when and after the respective push-button switch has been closed.

6. An apparatus as claimed in claim 5, further comprising a disabling circuit means for disabling one of the self-energizing circuits, which has been energized as a result of the closure of the corresponding push-button switch, when any one of the remaining self-energizing circuits is closed.

* * * * *